United States Patent [19]

Shimizu

[11] Patent Number: 4,771,845
[45] Date of Patent: Sep. 20, 1988

[54] MOTOR-DRIVEN POWER STEERING SYSTEM AND METHOD OF CONTROLLING SAME

[75] Inventor: Yasuo Shimizu, Saitama, Japan

[73] Assignee: Honda Giken Kogyo Kabushiki Kaisha, Tokyo, Japan

[21] Appl. No.: 40,972

[22] Filed: Apr. 21, 1987

[30] Foreign Application Priority Data

Apr. 22, 1986 [JP] Japan .................. 61-93154

[51] Int. Cl.⁴ .............................................. B62D 5/04
[52] U.S. Cl. ............................. 180/79.1; 318/473; 361/24
[58] Field of Search ............... 180/79.1; 318/334, 434, 318/473, 488, 489; 361/24

[56] References Cited

U.S. PATENT DOCUMENTS

| | | | |
|---|---|---|---|
| 4,017,778 | 4/1977 | Koch | 318/473 |
| 4,510,547 | 4/1985 | Rudich, Jr. | 361/24 X |
| 4,527,653 | 7/1985 | Agarwal et al. | 180/79.1 |
| 4,591,014 | 5/1986 | Yasuda | 180/79.1 |
| 4,611,682 | 9/1986 | Yasuda et al. | 180/79.1 |
| 4,626,753 | 12/1986 | Letterman | 318/334 |
| 4,629,952 | 12/1986 | Shimizu | 318/432 |
| 4,639,651 | 1/1987 | Shimizu | 318/432 |
| 4,651,840 | 3/1987 | Shimizu | 180/79.1 |
| 4,656,409 | 4/1987 | Shimizu | 180/79.1 X |
| 4,657,103 | 4/1987 | Shimizu | 180/79.1 X |
| 4,660,669 | 4/1987 | Shimizu | 180/79.1 |
| 4,671,371 | 6/1987 | Shimizu | 180/79.1 |
| 4,671,372 | 6/1987 | Shimizu | 180/79.1 |

FOREIGN PATENT DOCUMENTS

| | | | |
|---|---|---|---|
| 60-35633 | 2/1985 | Japan . | |
| 2145678 | 4/1985 | United Kingdom | 180/79.1 |
| 2179310 | 3/1987 | United Kingdom | 180/79.1 |

Primary Examiner—John J. Love
Assistant Examiner—Charles R. Watts
Attorney, Agent, or Firm—Armstrong, Nikaido, Marmelstein & Kubovcik

[57] ABSTRACT

A motor-driven power steering system has a steering mechanism for interconnecting a steering wheel and a steerable wheel. An electric motor applies a steering assistive force to the steering mechanism. A plurality of frictional elements are each provided with a lubricating material having a temperature-dependent viscosity. The motor-driven power steering system also includes a steering torque detector for detecting a steering torque applied by the steering wheel through the steering mechanism and for generating a signal indicative of the steering torque a temperature detects for detecting the temperature of at least one of the frictional elements and generates a signal indicative of the temperature. A motor control signal generator generates a motor control signal based on at least the signals from the steering torque detector and the temperature detector. A motor driver controls the electric motor based on the motor control signal. There is also disclosed a method of controlling the motor-driven power steering system by controlling the electric motor irrespective of the friction of the frictional elements which varies dependent on the temperature.

5 Claims, 6 Drawing Sheets

MOTOR-DRIVEN POWER STEERING SYSTEM AND METHOD OF CONTROLLING SAME

BACKGROUND OF THE INVENTION

1. Field of the Invention

The present invention relates to a motor-driven power steering system which employs an electric motor for generating assistive steering power that is applied to a steering mechanism to reduce a steering force to be manually applied, and a to method of controlling such a motor-driven power steering system more particularly the present invention relates to a motor-driven power steering system and a method of controlling the same for the temperature-compensated control of the assistive steering power applied to the steering mechanism based on a change in the temperature within or of the power steering system.

2. Description of the Relevant Art

Conventional motor-driven power steering systems for use on automotive vehicles reduce the manually applied steering force to a steering wheel by transmitting the rotative power of an electric motor through a speed reducer, such as a gear mechanism or a ball-screw mechanism, to a steering mechanism.

Various characteristics of a motor-driven power steering system vary dependent on the temperature of or within the system. The temperature of or within the motor-driven power steering system may varied vary according to the ambient temperature, especially when the system is used in colder environments, or the electric motor of the system, which itself is a heat source in the system.

One of the various characteristics that tends to vary, as the temperature of or within the power steering system varies, is the output torque of the motor which varies upon an increase in the temperature brought about by the motor. An excessive temperature rise might cause damage to the electric insulation of the motor, resulting in a motor burnout. One solution to this problem is disclosed in Japanese Laid-Open Patent Publication No. 60-35663. In the disclosed motor-driven power steering system, the current flowing through the motor is detected and monitored for any increase in the motor temperature. Before the motor temperature rises beyond a prescribed level, the energizing current supplied to the motor is lowered to reduce the amount of heat produced by the motor, thus protecting the power steering system.

The steering mechanism of a motor-driven power steering system has many frictional elements, such as bearings, which are provided with a lubricating material such as grease for smooth operation, long service life, and rust prevention. In the control of the electric motor of the power steering system, the steering feeling, given to the driver by the steering mechanism, is prevented from being lowered due to the frictional elements for the following reason. One torque control signal, among may control signals used for controlling the assistive power from the motor, is divided into and composed of a road load component and a friction component. The friction component of the torque control signal can be controlled to control the motor for overcoming the friction of the steering mechanism, or can be adjusted according to the driver's preference, thus improving the steering feeling.

In such a motor-driven power steering system, the viscosity of the lubricating material varies as the temperature changes. More specifically, in general, the viscosity of the lubricating material is high in a low-temperature range and low in a high-temperature range. When the automobile runs at a low temperature, the viscosity of the lubricating material is increased and the friction component of the torque control signal becomes insufficient, making the steering wheel feel heavy when it starts turning. Conversely, when the automobile runs at a high temperature, the viscosity of the lubricating material is increased and the friction component of the torque control signal becomes excessive, with the result that the reaction of the steering wheel as felt by the driver is undesirably low.

SUMMARY OF THE INVENTION

In view of the aforesaid shortcomings of the conventional motor-driven power steering systems, it is an object of the present invention to provide a motor-driven power steering system for use on an automotive vehicle and a method of controlling the same for giving the vehicle driver a less variable steering feeling or a light steering feeling, regardless of the temperature-dependent friction of various frictional elements of the power steering system, by detecting the temperature of or within the power steering system and determining an optimum friction component of a torque control signal based on the detected temperature.

According to the present invention, there is provided a motor-driven power steering system comprising a steering mechanism interconnecting a steering wheel and a steerable wheel. A electric motor applies a steering assistive force to the steering mechanism. A plurality of frictional elements, each provided with a lubricating material, have a temperature-dependent viscosity. A steering torque detecting means detects a steering torque applied by the steering wheel to the steering mechanism and generates a signal indicative of the steering torque. A temperature detecting means detects the temperature of at least one of the frictional elements and generates a signal indicative of the temperature. A motor control signal generating means generates a motor control signal based on at least the signals from the steering torque detecting means and the temperature detecting means. A motor driver means controls the electric motor based on the motor control signal. There is also provided a method of controlling the motor-driven power steering system by controlling the electric motor irrespective of the friction of the frictional elements which varies dependent on the temperature.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

A motor-driven power steering system according to the present invention includes a speed reducer such as a gear mechanism or a ball-screw mechanism, a motor, and other mechanisms, including a number of frictional elements each provided with a lubricating material having a temperature-dependent viscosity.

Figure 1:
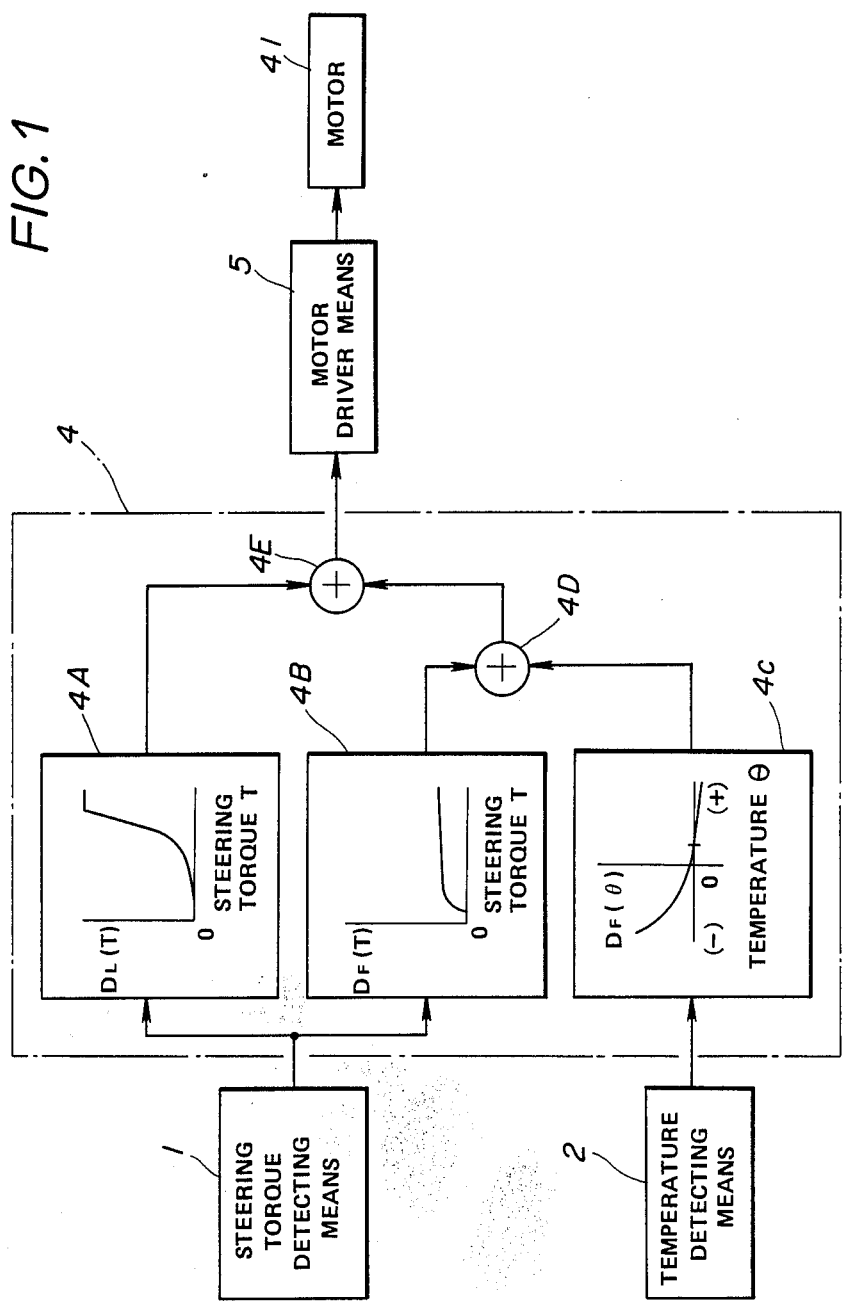
FIG. 1 is a block diagram of a control system of a motor-driven power steering system of the present invention.

As shown in FIG. 1, a motor-driven power steering system of the present invention comprises a steering torque detecting means 1 for detecting a steering torque applied to a steering mechanism, a temperature detecting means 2 for detecting the temperature in the power steering system, i.e., the temperature of at least one of the frictional elements, a motor control signal generating means 4 for generating a motor control signal based on a steering torque signal from the steering torque detecting means 1 and a temperature signal from the temperature detecting means 2, and a motor driver means 5 for controlling an electric motor 41 based on the motor control signal.

The motor control signal generating means 4 includes a road load control signal producing means 4A for determining and producing a road load control signal indicative of a road load based on the steering torque signal, a friction control signal producing means 4B for determining and producing a friction control signal indicative of the friction of the frictional elements, a temperature-corrective-value producing means 4C for determining and producing a temperature-corrective value based on the temperature signal, a first processing means 4D for correcting the friction control signal based on the temperature-corrective value, and a second processing means 4E for adding the corrected friction control signal from the first processing means 4D to the road load control signal from the road load control signal producing means 4A.

The first processing means 4D corrects the friction control signal, based on the temperature-corrective value, in such a manner that the friction control signal will be reduced as the temperature increases and will be increased as the temperature decreases. The second processing means 4E adds the corrected friction control signal to the road load control signal thereby to produce a torque control signal. The motor control signal generating means 4 determines the motor control signal from the torque control signal and applies the motor control signal to the motor driver means 5, which then controls the motor 41 with the motor control signal. Since the friction control signal, which constitutes part of the torque control signal, is corrected by the temperature-corrective value, therefore, the motor 41 is controlled irrespective of how the viscosity of the lubricating material may be varied by the temperature. Accordingly, the steering feeling which the driver obtains through the steering wheel is prevented from being lowered or impaired due to changes in the temperature.

Figure 2:
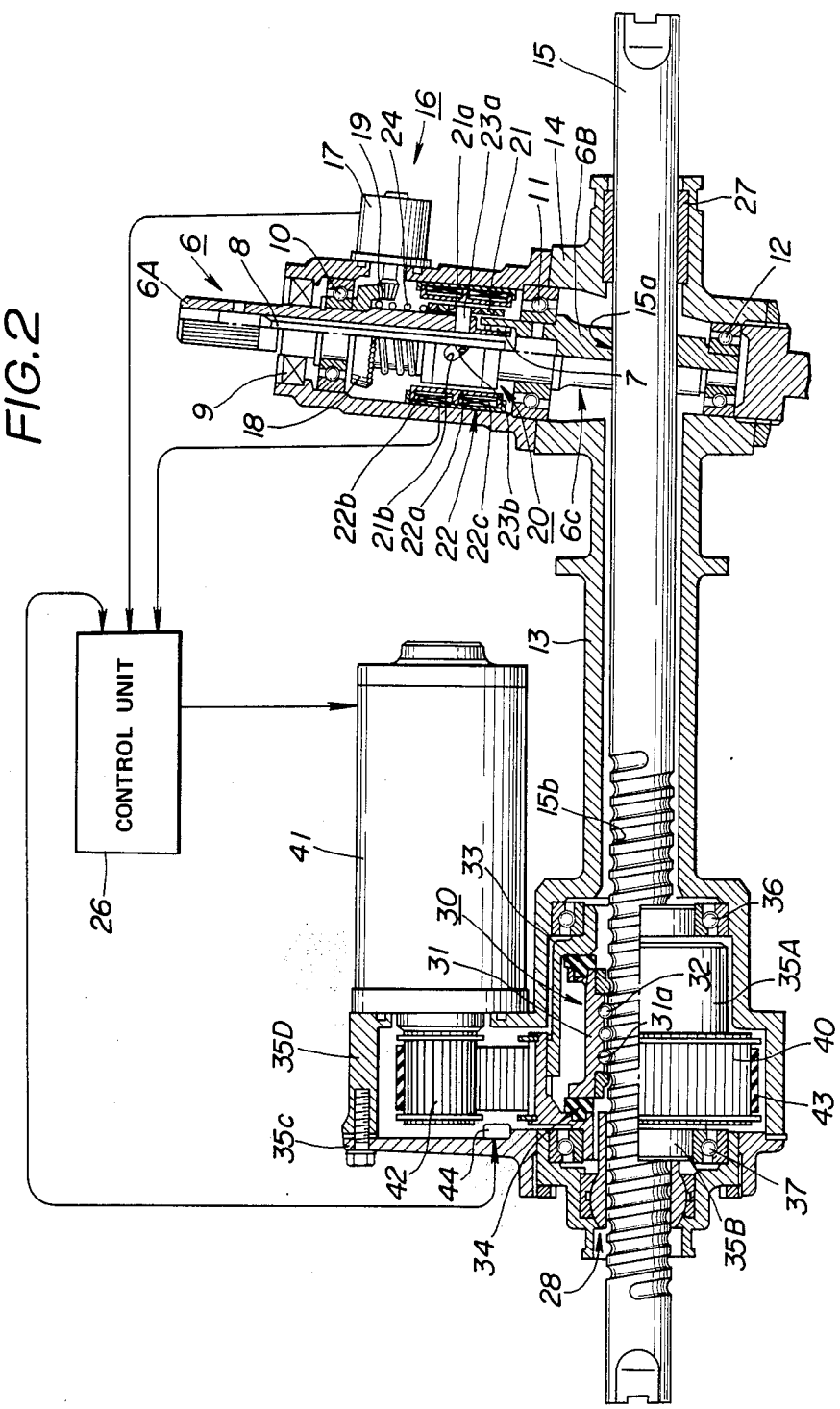
FIG. 2 is a longitudinal cross-sectional view, partly in block form, of the motor-driven power steering system of the present invention.

FIG. 2 shows, in greater detail, the motor-driven power steering system for use on an automotive vehicle.

A pinion shaft 6 comprises first and second shaft members 6A, 6B coaxial with each other. The first shaft member 6A has an inner end supported in the inner end of the second shaft member 6B by means of a bearing 7. The inner ends of the first and second shaft members 6A, 6B are coupled to each other by a torsion bar 8, so that the first and second shaft members 6A, 6B are rotatable about their own axes relatively to each other through a certain angle, but will rotate in unison beyond that angle. The pinion shaft 6 is rotatably supported by bearings 10, 11, 12 in a pinion holder 14 integrally formed with a rack case 13. A seal member 9 is supported in the pinion holder 14 around the pinion shaft member 6A. The second shaft member 6B has a pinion gear 6c meshing with rack teeth 15a on the back of a rack shaft 15 for converting rotation of the pinion shaft 6 to linear motion of the rack shaft 15. The pinion shaft 6 is coupled to a steering wheel through a universal joint and a steering shaft (not shown). The rack shaft 15 is coupled at its opposite ends by tie rods (not shown) to knuckles on which respective wheels are rotatably supported. Therefore, rotation of the steering wheel is converted to angular movement of the wheels to steer the automotive vehicle.

Around the pinion shaft 6, there are disposed a steering rotation sensor 16 and a steering torque sensor 20. A ball-screw mechanism 30 and a larger-diameter toothed pulley 40 are disposed on the rack shaft 15 at its end remote from the rack teeth 15a. The larger-diameter toothed pulley 40 is operatively coupled by a timing belt 43 to a smaller-diameter toothed pulley 42 mounted on the rotatable shaft of an electric motor 41 mounted on the rack case 13 parallel to the rack shaft 15. Thus, rotation of the motor 41 is transmitted through the pulley 42, the timing belt 43, and the pulley 40 to the ball-screw mechanism 30, which converts the rotation to linear motion of the rack shaft 15 while reducing the speed of rotation.

More specifically, the steering rotation sensor 16 comprises a DC generator 17 fixedly mounted on the pinion holder 14 and having a rotatable shaft extending perpendicularly to the first shaft member 6A. The shaft of the generator 17 supports thereon a bevel gear 19 held in mesh with a bevel gear 18 mounted on the first shaft member 6A. Therefore, when the pinion shaft 6 is rotated about its own axis, the shaft of the generator 17 is rotated to enable the generator 18 to produce a DC voltage having a polarity dependent on the direction of rotation of the pinion shaft 6 and a magnitude commensurate with the speed of rotation of the pinion shaft 6. The generated DC voltage is applied to a control unit 26.

The steering torque sensor 20 comprises a magnetic tubular moving core 21 fitted axially movably over the pinion shaft 6 where the first and second shaft members 6A, 6B are interfitted, and a differential transformer 22 fixedly mounted in the pinion holder 14. The moving core 21 has a pair of slots 21a defined in diametrically opposite side wall portions thereof parallel to the axis of the moving core 21 and a pair of slanted slots 21b defined in diametrically opposite side portions obliquely to the axis of the moving core 21. The first shaft member 6A has a pair of pins 23a engaging in the slots 21a, respectively, and the second shaft member 6B has a pair of pins 23b engaging in the slots 21b, respectively. Thus, relative rotation of the first and second shaft members 6A, 6B causes axial displacement of the moving core 21. The moving core 21 is axially biased by means of a coil spring 24 disposed around the first shaft member 6A and acting between the bevel gear 18 and the moving core 21.

The differential transformer 22 comprises a primary coil 22a and a pair of secondary coils 22b, 22c. The primary coil 22a is supplied with an AC pulse signal from the control unit 26, and the secondary coils 22b, 22c differentially produce analog output pulse signals. The output signals from the secondary coils 22b, 22c vary dependent on the direction in which the moving coil 21 is axially displaced and the amount by which the moving coil 21 is axially displaced. Therefore, the steering torque sensor 20 detects the magnitude of the steering torque applied to the steering wheel and the direction in which the steering torque acts.

The rack shaft 15 is rotatably and axially movably supported in the rack case 13 by means of a bearing 27 and a spherical bearing 28. The rack shaft 15 has a helical ball-screw groove 15b defined in an outer peripheral surface thereof. A ball nut 31 is disposed around the grooved portion of the rack shaft 15 and has a helical ball-screw groove 31a defined in an inner peripheral surface thereof. A plurality of balls 32 are received in the grooves 15b, 31a and roll therethrough and circulate through a circulatory path defined in the ball nut 31. The ball screw grooves 15b, 31a, the balls 32, and the ball nut 31 jointly constitute the ball-screw mechanism 30. Rotation of the ball nut 31 is therefore converted through the balls 32 to smooth linear motion of the rack shaft 15. The ball nut 31 is resiliently sandwiched axially between pulley cases 35A, 35B with resilient members 33, 34 disposed therebetween. The pulley cases 35A, 35B are rotatably supported in the rack case 13 by means of angular-contact bearings 36, 37, respectively. The pulley case 35A supports the larger-diameter pulley 40 on its outer periphery. As described above, rotation of the motor 41 controlled by the control unit 26 is transmitted through the smaller-diameter pulley 42, the timing belt 43, and the larger-diameter pulley 40 to the ball-screw mechanism 30 and then to the rack shaft 15.

The ball-screw mechanism 30, the pulleys 40, 42, the timing belt 43, and the pulley cases 35A, 35B are covered by pulley cases 35C, 35D integrally fixed to the rack case 13. A temperature sensor 44 is disposed in the pulley cases 35C, 35D, e.g., mounted on an inner wall surface of the pulley case 35C in the illustrated embodiment.

The temperature sensor 44 is in the form of a thermistor with its resistance variable as the temperature changes. The temperature sensor 44 thus produces a voltage which decreases as the temperature increases. While the temperature sensor 44 is shown as being mounted on the inner wall surface of the pulley case 35C, it may be placed anywhere in the power steering system insofar as it can detect the average temperature of the various frictional elements or preferably the lubricating material applied to the frictional elements.

Figure 3:
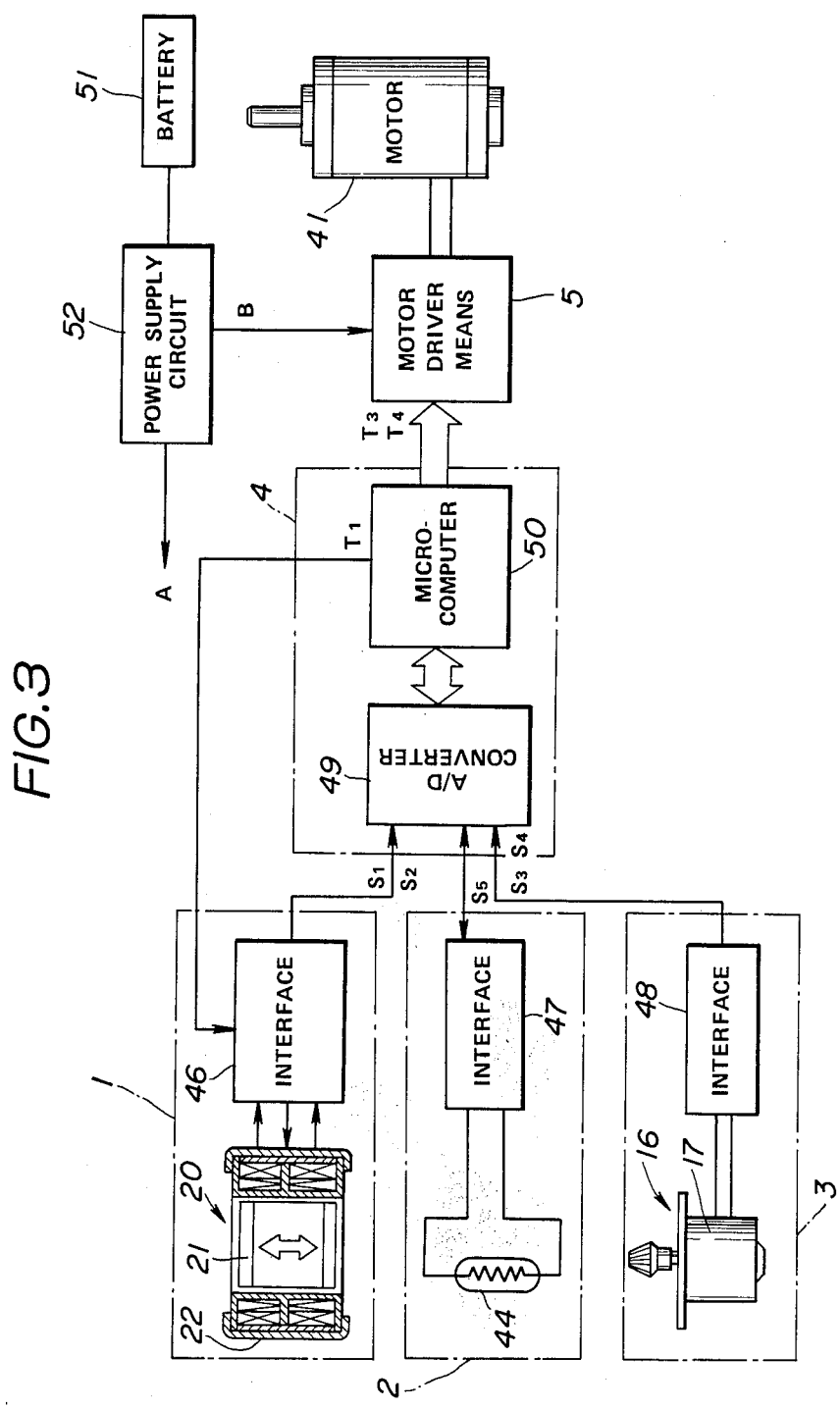
FIG. 3 is a block diagram of a control unit of the motor-driven power steering system shown in FIG. 2.

The control unit 26 will be described in detail with reference to FIG. 3. The motor control signal generating means 4 comprises an A/D converter 49 and a microcomputer unit 50. The microcomputer unit 50 is supplied with detected signals S1 through S5 from the steering torque detecting means 1, the temperature detecting means 2, and the steering rotation detecting means 3 through the A/D converter 49 according to commands from the microcomputer unit 50.

The steering torque detecting means 1 comprises the steering torque sensor 20 and a steering torque interface 46. The steering torque interface 46 frequency-divides reference clock pulses T1 from the microcomputer 50 to produce an AC signal and applies the AC signal to the primary coil of the differential transformer 22, and rectifies and smooths the output signals from the secondary coils 22b, 22c of the differential transformer 22. The steering torque detecting means 1 produces steering torque signals S1, S2 indicative of the direction and magnitude of an applied steering torque.

The steering rotation detecting means 3 comprises the steering rotation sensor 16 and a steering rotation interface 48. The steering rotation interface 48 amplifies the output from the DC generator 17 of the steering rotation sensor 16 according to the polarity thereof. The steering rotation detecting means 3 produces steering rotation signals S3, S4 indicative of the steering direction and speed of the steering wheel.

The temperature detecting means 2 comprises a resistance bridge circuit including the temperature sensor 44 and a temperature interface 47 including an amplifier for amplifying an output from the bridge circuit. When the resistance of the temperature sensor 44 is varied due to a temperature change, the bridge circuit is brought out of equilibrium and produces a differential voltage that is issued as a signal S5 representing a temperature $\theta$.

The microcomputer unit 50 has an I/O port, memories, a processor, a controller, registers, and a clock generator, and is operated by clock pulses. A power supply circuit 52 for energizing the microcomputer unit 50, the motor driver means 5, and the various detecting means comprises a fuse circuit connected through an ignition key switch to the positive terminal of a vehicle-mounted battery 51, a relay circuit connected to the output terminal of the fuse circuit, and a constant-voltage circuit. The power supply circuit 52 supplies electric power through an output terminal B to the motor driver means 5, and also supplies electric power through an output terminal A to the microcomputer 50 and the detecting means 1, 2, 3. When the key switch is closed, the microcomputer 50 operates under programmed instructions to enable the A/D converter 49 to convert the signals S1 through S5 to respective digital signals and to process the digital signals to issue motor control signals T3, T4 to the motor control means 5 for thereby controlling the motor 41. The motor control signal generating means 4 shown in FIG. 1 is implemented by the A/D converter 49 and the microcomputer unit 50, and the producing means 4A, 4B, 4C and the processing means 4D, 4E shown in FIG. 1 are implemented by the microcomputer unit 50. In the present embodiment, the control unit also includes a steering rotation control signal generating means and a third processing means for adding an output from the steering rotation control signal generating means to the output from the second processing means 2E. These steering rotation control signal generating means and third processing means are also implemented by the microcomputer unit 50.

The motor driver means 5 comprises a bridge circuit of four FETs (field-effect transistors) and an interface for driving the FET bridge circuit with the control signals T3, T4 from the microcomputer unit 50. The interface of the motor driver means 5 selectively energizes the FETs such that it turns on one of one pair of FETs while PWM-driving the other FET, or it turns on one of the other pair of FETs while PWM-driving the other FET, for controlling the direction of rotation and the power (rotational speed and torque) of the motor 41 with the motor control signals T3, T4.

Figure 4:
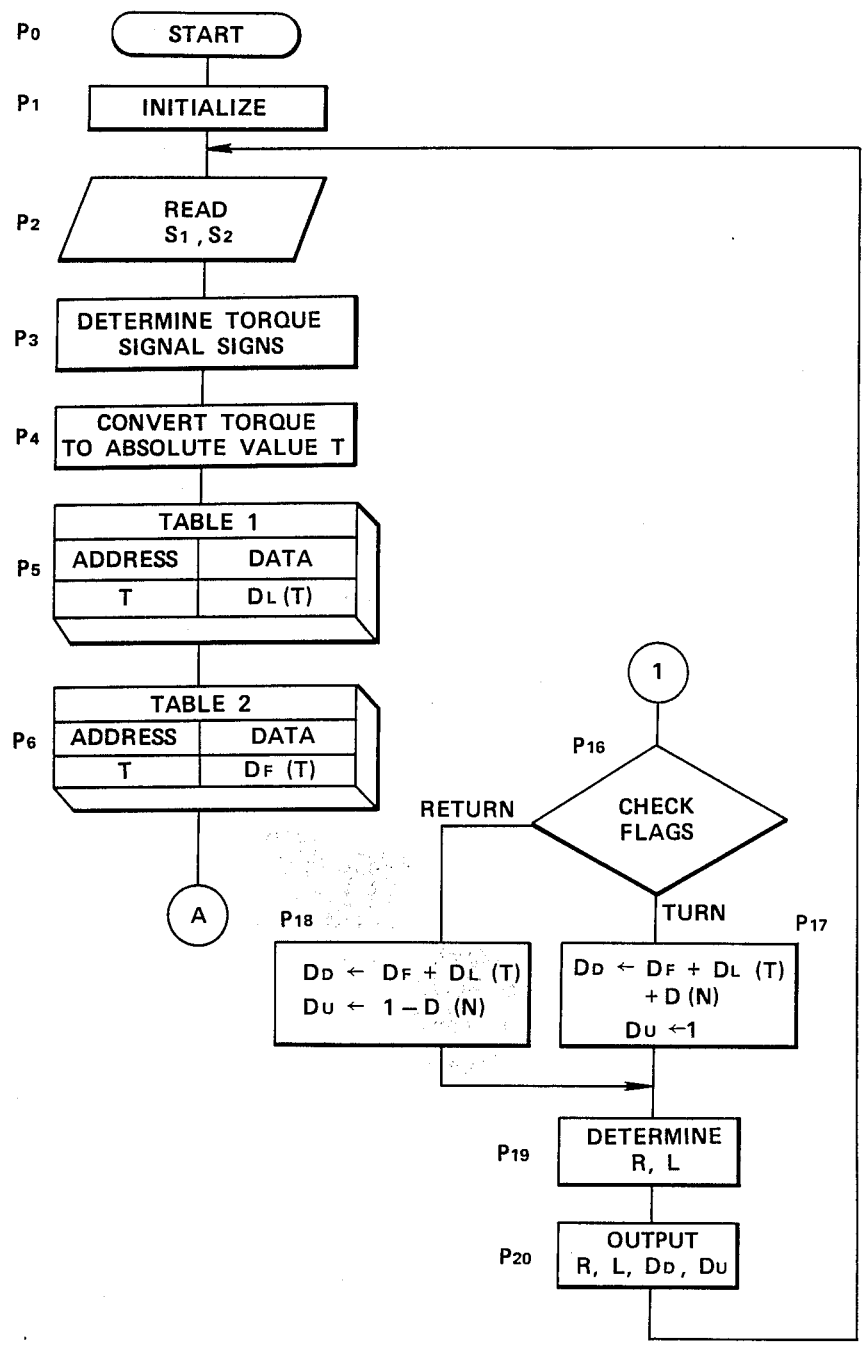
FIGS. 4a and 4b are a flowchart of a control sequence of the control unit.
Figure 4B:
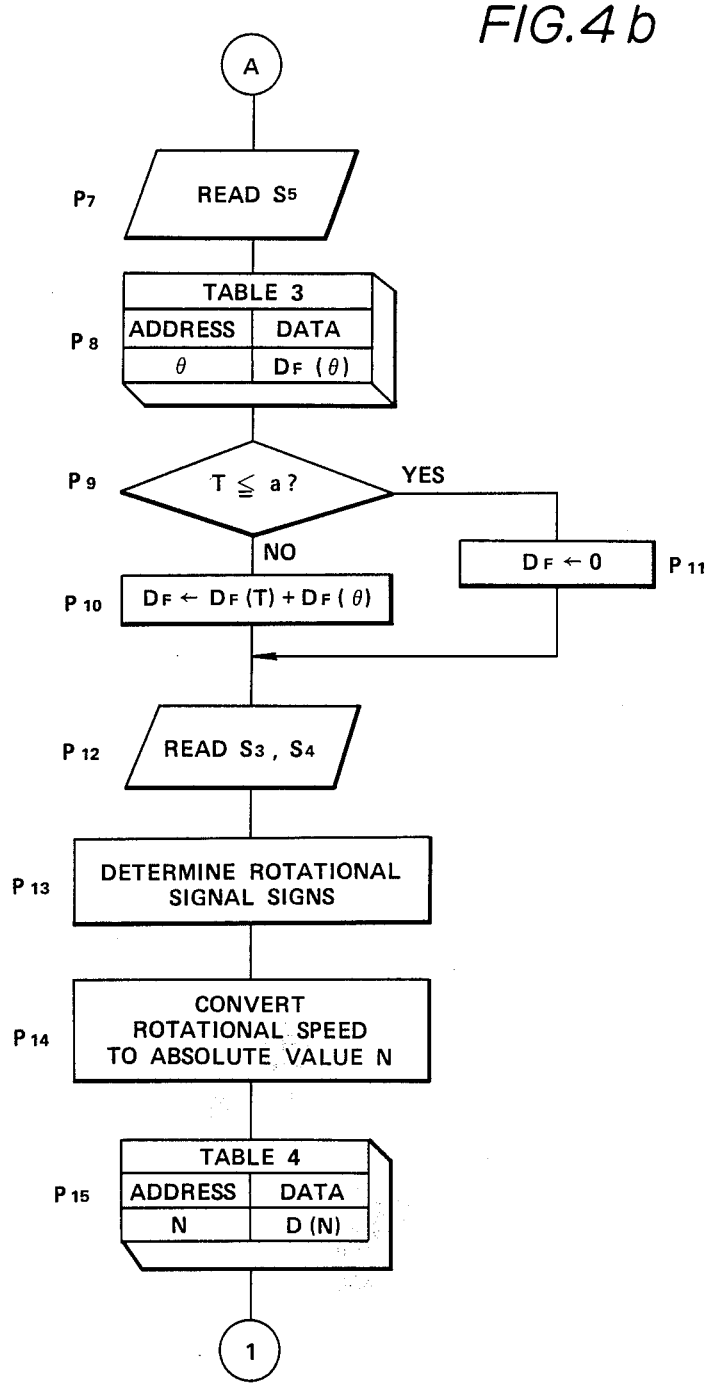

Operation of the motor-driven power steering system will be described with reference to FIGS. 4a and 4b.

When the key switch 55 is turned on, the microcomputer unit 50 and other circuits are energized to start a control sequence at a step P0. In the microcomputer unit 50, the I/O port is set and the data in the registers and RAM are cleared for initialization in a step P1.

Then, the steering torque signals S1, S2 are read in a step P2. In a next step P3, the direction and magnitude of the steering torque are computed from the detected signals S1, S2, and a torque direction flag indicative of the direction in which the torque is applied is set and the magnitude of the torque is converted to an absolute value T which is stored (steps P3, P4).

Figure 5:
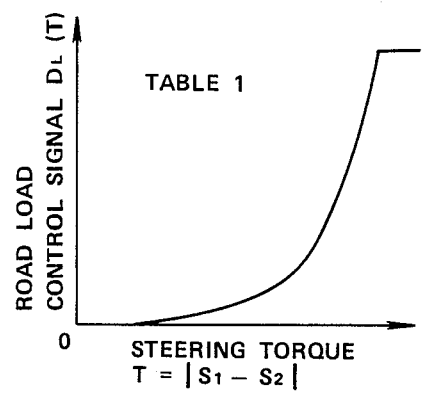
FIG. 5 is a graph showing a road load control signal plotted against steering torques.
Figure 6:
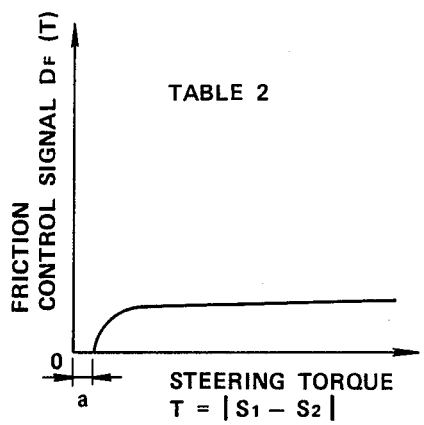
FIG. 6 is a graph showing a friction control signal plotted against steering torques.

Then, data items are read out of memory tables 1, 2 by being addressed by the absolute value T of the steering torque in steps P5, P6. The table 1 stores road load control signals $D_L(T)$, corresponding to road loads, from torque control signals representative of the absolute values T of steering torques, as shown in FIG. 5, and the table 2 stores friction control signals $D_F(T)$, corresponding to losses of the assistive power from the motor 41 which are caused by the frictional elements, from torque control signals representative of the absolute values T of steering torques, as shown in FIG. 6.

Figure 7:
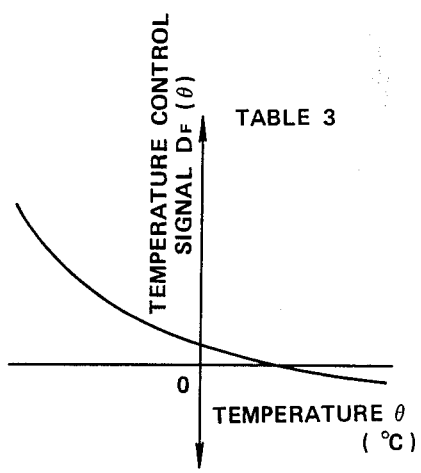
FIG. 7 is a graph showing a temperature control signal plotted against temperatures.

A step P7 then reads the temperature signal S5, and a data item is read out of a memory table 3 by being addressed by the temperature $\theta$ represented by the temperature signal S5, in a step P8. The table 3 stores temperature-corrective values $D_F(\theta)$ corresponding to temperatures $\theta$ as shown in FIG. 7. The temperature-corrective value $D_F(\theta)$ is a duty ratio for correcting the friction control signal $D_F(T)$, and is of such characteristics that it becomes smaller as the temperature goes higher and becomes larger as the temperature goes lower, as illustrated in FIG. 7.

A step P9 ascertains whether the absolute value T of steering torque is at most a prescribed value a or not, i.e., whether T<a or not. The value a indicates a dead zone in the absolute steering torque valve as shown in FIG. 6. If T>a, the absolute steering torque value T is not in the dead zone, and $D_F(T)+D_F(\theta)=D_F$ is computed in a step P10. Thus, the friction control signal $D_F(T)$ has been corrected by the corrective value $D_F(\theta)$. The duty ratio of the corrected friction control signal $D_F$ is smaller as the temperature $\theta$ is higher and greater as the temperature $\theta$ is lower. If T<=a, the absolute steering torque value T is in the dead zone a, and hence the friction control signal $D_F(T)$ is zero. Control goes to a step P11 in which $D_F=0$, i.e., the friction control signal is not corrected by the corrective value $D_F(\theta)$ corresponding to the temperature $\theta$. Then, control proceeds to a step P12.

The step P12 reads the steering rotation signals S3, S4. The direction and magnitude of steering rotation are computed from the steering rotation signals S3, S4, and a rotation direction flag indicative of the direction of steering rotation is set and the magnitude of steering rotation is converted to an absolute value N which is stored (steps P13, P14).

Figure 8:
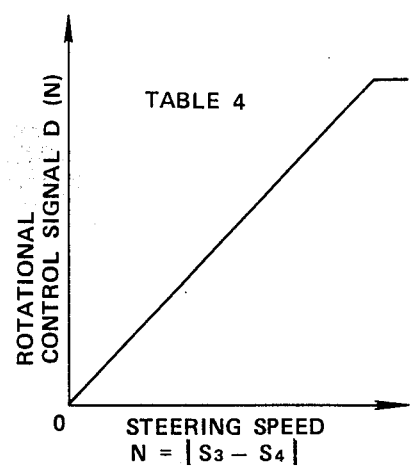
FIG. 8 is a graph showing a rotation control signal plotted against steering speeds.

Then, a data item is read out of a memory table 4 by being addressed by the absolute value N of the steering speed in a step P15. The table 4 stores steering rotation control signals D(N) corresponding to the absolute values N of steering speeds, as shown in FIG. 8.

The step P15 is followed by a step P16 which determines whether the steering wheel is turned or returned from the torque direction flag and the rotation direction flag. If the steering wheel is turned, $D_D=D_F+D_L(T)+D(N)$ and $D_U=1$ are computed, and if the steering wheel is returned, $D_D=D_F+D_L(T)$ and $D_U=1-D(N)$ are computed. $D_D$, $D_U$ represent duty ratios indicated by the control signal T4 which determines the power to be produced by the motor 41. For example, $D_D$ is given to one of a pair of FETs of the motor driver bridge circuit, and $D_U$ is given to the other FET, the duty ratios $D_D$, $D_U$ being PWM signals. A next step P19 determines rotation directions R, L from the torque direction flag. R, L indicate signs representative of the directions of rotation for the control signal T3 which determines the direction in which the motor 41 is to rotate. For example, R represents clockwise rotation, and L counterclockwise rotation. The control signal T3 comprising R, L and the control signal T4 comprising $D_D$, $D_U$ are issued to the motor driver means 5. Then, control returns to the step P2 to repeat the above control cycle.

As described above, the friction control signal which constitutes the torque control signal of the motor control signals is corrected according to predetermined temperature-dependent characteristics such that the friction control signal is reduced as the temperature goes higher and is increased as the temperature goes lower. Therefore, operation of the steering mechanism is less affected by the temperature-dependent viscosity of the lubricating material such as oil or grease, and the steering feeling as felt by the driver is prevented from being lowered or impaired by changes in the temperature.

In the above embodiment, the torque control signal corresponding to the absolute value T of the steering torque is divided into a road load control signal $D_L(T)$ corresponding to a road load and a friction control signal $D_F(T)$ corresponding to a loss caused by a frictional element of assistive torque produced by the motor, and the friction control signal is corrected by the temperature control signal $D_F(\theta)$. However, since the friction control signal becomes substantially constant in a range higher than a certain steering torque value, as shown in FIG. 6, such a constant value of the friction control signal may be added in advance to the temperature control signal to produce a temperature-compensated value, which may be added to the road load control signal.

While in the illustrated embodiment the steering rotation detecting means is added and the steering rotation control signal is employed to produce the motor control signals, motor control signals may also be produced by at least the steering torque detecting means and the temperature detecting means. In such a case, the road load control signal producing means may be arranged to produce a power component which doubles as a torque component and a rotation speed component to provide motor control signals similar to those of the illustrated embodiment.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-driven power steering system comprising:
a steering wheel;
a steerable wheel;
a steering mechanism interconnecting said steering wheel and said steerable wheel;
an electric motor applying a steering assistive force to said steering mechanism;
a plurality of frictional elements of said electric motor and said steering mechanism each being provided with a lubricating material having a temperature-dependent viscosity;
steering torque detecting means for detecting a steering torque applied by the steering wheel to said steering mechanism and for generating a signal indicative of the steering torque;
temperature detecting means for detecting the temperature of at least one of said frictional elements and for generating a signal indicative of the temperature;
motor control signal generating means for generating a motor control signal based on at least the signals from said steering torque detecting means and said temperature detecting means, wherein said motor control signal generating means includes
road load control signal producing means for determining and producing a road load control signal indicative of a road load based on the signal from said steering torque detecting means,
temperature-compensated-value producing means for determining and producing a temperature-compensated value corresponding to a loss of assistive power from said electric motor which is caused by a change brought about by the temperature in the friction of said one frictional element, based on the signal from said temperature detecting means, and
processing means for adding said road load control signal and said temperature-compensate value; and
motor driver means for controlling said electric motor based upon the motor control signal.

2. A motor-driven power steering system according to claim 1, wherein said motor control signal generating means further comprises:
friction control signal generting means for determining and producing a friction control signal compensating for a loss of assistive power from said electric motor which is caused by said one frictional element, based on the signal from said steering torque detecting means; and
wherein said processing means includes first processing means for correcting said frictional control signal with said temperature-corrective value; and
second processing means for adding said road load control signal to an output signal from said first processing means.

3. A motor-driven power steering system according to claim 2, further including steering rotation detecting means for detecting the speed of rotation of the steering wheel as transmitted to said steering mechanism and generating a signal indicative of the speed of rotation, said motor control signal generating means being arranged to determine said motor control signal based on the signals from said steering torque detecting means, said temperature detecting means, and said steering rotation detecting means.

4. A motor-driven power steering system according to claim 3, wherein said motor control signal generating means further includes steering rotation control signal producing means for determining and producing a steering rotation control signal based on the signal from said steering rotation detecting means, and third processing means for adding said steering rotation control signal to an output signal from said second processing means.

5. A method of controlling a motor-driven power steering system having a seering mechanism interconnecting a steering wheel and a steerable wheel, an electric motor applying a steering assistive force to the steering mechanism, a plurality of frictional elements of the electric motor and the steering mechanism, each being provided with a lubricating material having a temperature-dependent viscosity, said motor comprising the steps of:
detecting a steering torque applied by the steering wheel to said steering mechanism and generating a signal indicative of the steering torque;
determining and producing a road load control signal indicative of a road load based on the signal indicative of the steering torque;
detecting the temperature of at least one of asid frictional elements and generating a signal indicative of the temperature;
determining and producing a temperature compensated value corresponding to a loss of assistive power from said electic motor which is caused by a change brought about by the temperature in the friction of said one frictional element, based on the signal indicative of the temperature;
adding said road load control signal and said temperature-compensated value;
generating a motor control signal based on at least the detected signals; and
controlling said electric motor based on said motor control signal.

* * * * *